United States Patent Office 3,420,697
Patented Jan. 7, 1969

3,420,697
PERFLUOROALKYL-SUBSTITUTED POLYAMIDE OIL-REPELLENCY COMPOUND AND TEXTILE MATERIALS TREATED THEREWITH
Richard F. Sweeney, Dover, and Koei-Liang Liauw, Morristown, N.J., assignors to Allied Chemical Corporation, New York, N.Y., a corporation of New York
No Drawing. Filed Aug. 25, 1965, Ser. No. 482,599
U.S. Cl. 117—121                    11 Claims
Int. Cl. D06m 15/00; C07c 103/32

ABSTRACT OF THE DISCLOSURE

Novel perfluoroalkyl-substituted polyamide compositions prepared by reacting a perfluorocarboxylic acid or derivative thereof with a polyalkylene polyamine. The resultant polyamide products are useful as oil repellents, particularly for the treatment of fibers.

---

This invention relates to novel fluorocarbon derivatives. More particularly, this invention is concerned with perfluoroalkyl polyamide compounds, valuable as oil-repellency agents.

Accordingly, a primary object of the invention is to provide novel perfluoroalkyl polyamide compounds. Another object is the provision of novel perfluoroalkyl polyamide compositions for application as oil-repellency agents. A further object is to provide textiles and other articles which have been treated with the novel compositions of this invention. A still further object is to provide a method of rendering textiles and other articles oil repellent by application thereto of the novel compositions of this invention. These and other objects are apparent from the description which follows.

The novel perfluoroalkyl polyamide compounds of the present invention are obtained by reaction of a polyalkylene polyamine compound corresponding to the general formula:

$$\mathrm{NH_2}\!\left(\!\mathrm{C_xH_{2x}N}\atop Q\right)_{\!y}\!\mathrm{C_xH_{2x}NH_2}$$

wherein $x$ is an integer of from 2 to 6, $y$ is an integer of from 1 to 4 and Q is hydrogen or an aminoalkyl radical having the formula—$C_xH_{2x}NH_2$ in which $x$ has the afore-stated meaning with a perfluorocarboxylic acid reactant. These compounds may be termed polyperfluoroalkanoyl polyazaalkane compounds and are characterized by the structural formula:

$$\mathrm{R_f\!-\!\overset{O}{\overset{\|}{C}}\!-\!\overset{H}{\overset{|}{N}}\!-\!\!\left(\!\mathrm{C_xH_{2x}}\overset{Z'}{\overset{|}{N}}\!\right)_{\!y}\!\!-\!\mathrm{C_xH_{2x}}\!-\!\overset{H}{\overset{|}{N}}\!-\!Z}$$

wherein $R_f$ is a perfluoroalkyl group containing from 3 to 17 carbon atoms, $x$ is an integer of from 2 to 6, $y$ is an integer of from 1 to 4, Z is a member selected from the group consisting of hydrogen and an acyl radical having the formula

in which $R_f$ has the afore-stated meaning and Z' is a member selected from the group consisting of hydrogen, an acyl radical having the formula

in which $R_f$ has the afore-stated meaning and a radical having the formula

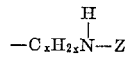

in which $x$ and Z have the afore-stated meaning, with the proviso that at least one of Z and Z' is an acyl radical or a radical having the formula

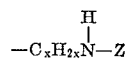

in which Z is an acyl radical, said acyl radical having the afore-stated formula.

In the above formula, $R_f$ is the same or different saturated straight-chain or branched-chain perfluoroalkyl group and the alkylene ($C_xH_{2x}$) linkage may be a straight-chain or branched-chain group, preferably containing from 2 to 4 carbon atoms. Compounds corresponding to the formula:

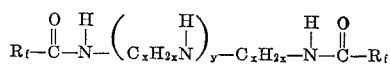

wherein $R_f$ is a perfluoroalkyl radical containing from 6 to 14 carbon atoms, $x$ is an integer of from 2 to 4 and $y$ is an integer of from 1 to 4 constitute preferred embodiments of the present invention.

The polyalkylene polyamine reactants employed in the preparation of the perfluoroalkyl polyamides are well-known compounds. These reactants may be straight-chain or branched-chain compounds and may be used in the form of a single compound, as a mixture of isomers or as a mixture of polyamines containing from 3 to 6 nitrogen atoms in the molecule. Specific examples of polyalkylene polyamines employable herein include diethylene triamine, di-n-propylene triamine, di-i-butylene triamine, di-n-hexylene triamine, triethylene tetramine, tri-i- propylene tetramine, tri-n-hexylene tetramine, 4-(2-aminoethyl)-diethylene triamine, tetraethylene pentamine, tetra-n-propylene pentamine, tetra-n-butylene pentamine, 4-(2-aminoethyl)-triethylene tetramine, tetra-n-hexylene pentamine and pentaethylene hexamine. Preferred poly alkylene polyamines are diethylene triamine, dipropylene triamine, triethylene tetramine and tetraethylene pentamine since these are the more readily commercially available compounds.

The perfluorocarboxylic acid reactant comprises a perfluorocarboxylic acid, an ester, anhydride or acid halide thereof. Perfluorocarboxylic acid reactants suitable for reaction with the above polyalkylene polyamine reactants are saturated straight-chain or branched-chain monocarboxylic acids or stated derivatives thereof containing from 4 to 18 carbon atoms in the acid portion of the molecule. Discrete molecular species of the perfluorocarboxylic acid reactants may be used or mixtures of these reactants in various proportions having the indicated carbon chain length may be employed. The perfluorocarboxylic acid derivatives likewise employable for this purpose include the corresponding lower alkyl esters such as the methyl, ethyl, propyl and butyl ester thereof; acid halides such as the acid chloride, bromide and fluoride; and acid anhydrides thereof. The use of mixtures of lower alkyl esters of perfluorocarboxylic acids containing from 6 to 14 carbon atoms in the acid portion of the molecule are preferred in the preparation of the compounds of the present invention. Illustrative perfluorocarboxylic acid reactants include perfluorobutyric, perfluorocaproic, perfluorocaprylic, perfluorolauric, perfluoromyristic, perfluoropalmitic, and perfluorostearic acids, as well as various isomeric forms thereof.

Perfluorocarboxylic acid reactants herein contemplated containing up to about ten carbon atoms are readily prepared by the electrochemical fluorination of alkanoic acids in anhydrous hydrogen fluoride with subsequent hydrolysis of the resulting fluorinated acid fluorides, as disclosed in U.S. Patent 2,567,011, issued Sept. 4, 1951. Longer chain perfluorocarboxylic acid reactants, i.e., those containing from about 11 to 18 carbon atoms, may be obtained by reaction of perfluoroalkyl iodides with oleum containing about 15% to 45% sulfur trioxide at elevated temperatures followed by hydrolysis of the resulting perfluorocarboxylic acid fluoride, as disclosed in French Patent 1,343,601 of Oct. 14, 1963.

The perfluoroalkyl polyamide compounds of the present invention may be prepared by simply mixing the perfluorocarboxylic acid reactant with the polyalkylene polyamine starting material. These reactants may be charged in a molar proportion of 1 mol of polyalkylene polyamine to about 1 to 7, preferably 1.5 to 2.5 mols of perfluorocarboxylic acid reactant. A molar ratio of 2 mols of perfluorocarboxylic acid reactant to 1 mol of polyalkylene polyamine, which ratio provides the theoretical amount required, is especially desirable.

The reaction temperature, in general, is dependent upon the particular perfluorocarboxylic acid reactant and polyalkylene polyamine reactant involved. The temperature may range from about 0° C. to 200° C. although temperatures above about 100° C. are normally used when the perfluorocarboxylic acid reactant comprises a perfluorocarboxylic acid and temperatures below about 100° C. are preferred when an ester, anhydride or acid halide serves as the perfluorocarboxylic acid reactant. If desired, the reaction may be conducted in the presence of an inert organic solvent, and, when present, the maximum temperature employable is limited only by the reflux temperature of the mixture. Although the reaction may be effected at superatmospheric pressure, the reaction is preferably conducted at atmospheric pressure.

The inert organic solvent employable herein is generally one lower boiling than the perfluoroalkyl polyamide product and may be lower boiling or higher boiling than the by-product materials formed during the reaction. Any organic liquid which is capable of solubilizing the polyalkylene polyamine reactant and inert to the reactants and products of the reaction may be employed. Suitable inert organic solvents include ethers such as dioxane, diethyl ether, diisopropyl ether, di-n-propyl ether and tetrahydrofuran; hydrocarbons such as heptane, benzene, toluene and xylene; dimethylformamide; tetramethylenesulfone or any other customarily employed organic solvent.

When the perfluorocarboxylic acid reactant is present in the form of a lower alkyl ester of a perfluorocarboxylic acid, as preferred, an alcohol is obtained as by-product of the reaction. The alcohol may readily be removed by conducting the reaction at about the reflux temperature of the mixture, and the desired perfluoroalkyl polyamide product recovered as the distilland.

When a perfluorocarboxylic acid per se serves as the perfluorocarboxylic acid reactant, water is formed as by-product of the reaction and may be readily removed by conducting the reaction at temperatures above the boiling point of the by-product water. If desired, the perfluoroalkyl polyamide preparation may be facilitated by employment of azeotropic materials which aid in the removal of water should the reaction be effected at temperatures below the boiling point of the by-product water. Readily available organic substances capable of forming an azeotrope with water include xylene, toluene, benzene and tetralin.

When the acid halide is employed as the perfluorocarboxylic acid reactant, it is generally desirable to use a molar excess of polyalkylene polyamine compound, or if desired, to have present in the reaction mixture at least equimolar proportions of a halogen acid acceptor, typically, a trialkylamine such as trimethylamine and triethylamine; an alkali metal hydroxide such as sodium hydroxide, an alkali metal carbonate such as sodium carbonate; pyridine, etc. which reacts with a halogen acid evolved during the reaction to form a by-product salt. After completion of the reaction, the insoluble by-product salt, e.g., diethylene triamine hydrochloride, sodium chloride or pyridine hydrochloride, may be solubilized by addition of water or dilute base, and its removal effected by separation of the resulting aqueous layer.

The reaction product, obtained as a result of the reaction of the perfluorocarboxylic acid reactant and the polyalkylene polyamine reactant above described, may comprise a single compound conforming to the above stated structural formula, a mixture of isomers thereof or a reaction mass composed of amide products containing two or more amide functions depending upon the polyalkylene polyamine reactant employed, the reactivity of the perfluorocarboxylic acid reactant present, the solubility of the amide product obtained during the reaction in the reaction mixture and the molar proportions of perfluorocarboxylic acid employed. When a discrete molecular species of polyalkylene polyamine is subjected to reaction with the perfluorocarboxylic acid reactant, the desired perfluoroalkyl polyamide product is obtained as a solid and may be recovered by conventional means, as by filtration. However, when mixtures of polyalkylene polyamines, illustratively, commercial preparations containing mixtures of isomers thereof, are employed as a starting material in the process, the perfluoroalkyl polyamide product is obtained as a liquid and may be recovered as the distilland by distillation of the reaction mass.

The resulting solid or liquid perfluoroalkyl polyamide product is suitable without further purification for direct application as an oil-repellency agent. However, if desired, the perfluoroalkyl polyamide product may be further purified as by distillation or recrystallization from any commonly employed inert organic solvent such as acetonitrile, chloroform, ethanol and propanol.

The following examples relate to the preparation of representative compounds of the present invention but are not intended to be limiting on the scope thereof.

EXAMPLE 1

A solution of 49 grams (0.475 mol) of diethylene triamine in 60 ml. of diethyl ether was placed in a reaction vessel equipped with a dropping funnel, condenser, magnetic stirrer and a calcium chloride drying tube. After chilling the vessel in an ice water bath for a period of about 20 minutes, 34.2 grams (0.079 mol) of n-perfluorooctanoyl chloride were added with stirring to the contents of the vessel during a 30 minute period. After the addition of the n-perfluorooctanoyl chloride reactant was complete, the ice water bath was removed and the stirring was continued at room temperature for a period of 20 minutes. Thereafter, 100 ml. of an 8% aqueous sodium hydroxide solution were added to the reaction mixture and the stirring was continued for an additional 15 minutes. The resulting gelatinous precipitate was filtered at reduced pressure and washed with water. After air drying the precipitate, a yield of 31 grams of 1,7-di-n-perfluorooctanoyl-1,4,7-triazaheptane, a white solid (melting point 94–97° C.), having the following structural formula was obtained:

This compound was found to contain 27.01% carbon (theory 26.8%), 1.45% hydrogen (theory 1.23%) and 4.74% nitrogen (theory 4.71%). The infrared spectrum of the product compound showed a strong amide absorption (5.89 microns); the presence of the carboxylic acid function of the perfluorooctanoyl chloride reactant was not detected, indicating complete conversion of this reactant.

EXAMPLE 2

Six grams (0.014 mol) of n-perfluorooctanoyl chloride were charged in a vessel of the type described in Example 1. After chilling the vessel in an ice water bath for 15 minutes, a solution of 8.6 grams (0.084 mol) of diethylene triamine in 20 ml. of diethyl ether was added over a period of about 1 minute; a white precipitate was formed during the addition of the triamine. After stirring the reaction mixture for a period of about 15 minutes at room temperature, 8 ml. of a 5% aqueous sodium hydroxide solution were added and the stirring was continued for an additional 5 minutes. The resulting gelatinous product was filtered under reduced pressure and was washed several times with water. A yield of 5.9 grams of 1,7-di-n-perfluorooctanoyl-1,4,7-triazaheptane, a white solid (melting point 94–97° C.), was obtained. The infrared spectrum of this product was identical with the sample of 1,7-di-n-perfluorooctanoyl - 1,4,7 - triazaheptane obtained in Example 1.

EXAMPLE 3

To a solution of 5.5 grams (0.013 mol) of methyl-n-perfluorooctanoate in 15 ml. of diethyl ether was added 0.8 gram (0.008 mol) of diethylene triamine. The reaction mixture was allowed to stand at room temperature for a period of about 24 hours. After the addition of about 40 ml. of water to the product mixture, a white gelatinous precipitate was formed. The precipitate was filtered under vacuum and washed several times with water. After drying the precipitate at room temperature overnight (24 hours), 3.9 grams of 1,7-di-n-perfluorooctanoyl-1,4,7-triazaheptane, a white solid (melting point 94–97° C.), was obtained. The infrared spectrum of this product was identical with the sample of 1,7-di-n-perfluorooctanoyl-1,4,7-triazaheptane obtained in Example 1.

EXAMPLE 4

To the reaction vessel described in Example 1 containing 6.0 grams (0.015 mol) of perfluorooctanoic acid there was added 0.8 gram (0.008 mol) of diethylene triamine. Heat was evolved during the addition and a yellow solid was formed. The reaction mixture was heated to 145–150° C. for a period of 4 hours and the product mixture, after being permitted to cool to room temperature, was dissolved in diethyl ether, transferred to a separatory funnel and washed first with a 5% sodium hydroxide solution and finally with water. The organic layer was dried over anhydrous magnesium sulfate and a yellow gummy solid was obtained after removal of the ether by evaporation. After recrystallization from carbon tetrachloride, the infrared spectrum of the solid product was identical with the sample of 1,7-di-n-perfluorooctanoyl-1,4,7-triazaheptane obtained in Example 1.

EXAMPLE 5

To a solution of 20 grams (0.0467 mol) of methyl-n-perfluorooctanoate in 25 ml. of diethyl ether, there were added 3.07 grams (0.0235 mol) of di-n-propylene triamine. The resulting solution was heated under reflux temperature for a period of 24 hours. After removal of the solvent under reduced pressure, 16.6 grams of a light yellow oil, which solidified in about 30 minutes to give a white sticky solid, were obtained. The white sticky solid was recrystallized from acetonitrile to yield 1,9-di-n-perfluorooctanoyl-1,5,9-triazanonane (a white powder melting at 84–85° C.) having the following structural formula:

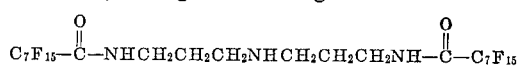

This compound was found to contain 28.63% carbon (theory 28.58%), 59.56% fluorine (theory 61.66%), 1.57% hydrogen (theory 1.63%) and 4.77% nitrogen (theory 4.55%). The infrared spectrum of the compound showed a strong amide absorption (5.89 microns); the presence of the carboxylic acid function of the methyl-n-perfluorooctanoate reactant was not detected, indicating complete conversion of this reactant.

EXAMPLE 6

To a water cooled solution of 21 grams (0.16 mol) of di-n-propylene triamine in 20 ml. of diethyl ether, there were added slowly 23 grams (0.053 mol) of n-perfluorooctanoyl chloride resulting in formation of a white precipitate. After the mixture was stirred at room temperature for a duration of about 15 minutes, about 25 ml. of a 10% aqueous sodium hydroxide solution were added. The resulting mixture was stirred for an additional period of about 15 minutes, the product mixture was extracted with diethyl ether and the ether extract was washed with water. After drying over anhydrous magnesium sulfate and removal of the ether solvent, a light yellow oil was obtained which solidified in about 1 hour to give a white sticky solid. The white sticky solid was recrystallized from acetonitrile to yield 1,9-di-n-perfluorooctanoyl-1,5,9-triazanonane, a white solid having a melting point of 84–85° C. The infrared spectrum of this product was identical with the sample of 1,9-di-n-perfluorooctanoyl-1,5,9-triazanonane obtained in Example 5.

EXAMPLE 7

To a solution of 20 grams (0.0467 mol) of methyl-n-perfluorooctanoate in 25 ml. of diethyl ether, there were added 3.4 grams (0.0233 mol) of triethylene tetramine. The resulting solution was heated under reflux temperature for a period of 24 hours. After removal of the solvent under reduced pressure, 20 grams of a white sticky solid were obtained which was subsequently recrystallized from acetonitrile. The product of this reaction was 1,10-di-n-perfluorooctanoyl-1,4,7,10-tetraazadecane, a white powder (melting point 89–82° C.) having the following structural formula:

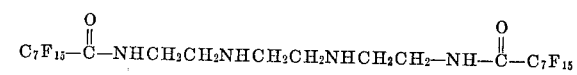

This compound was found to contain 28.15% carbon (theory 28.15%), 62.50% fluorine (theory 60.74%), 1.86% hydrogen (theory 1.72%) and 6.41% nitrogen (theory 5.97%). The infrared spectrum of the product compound showed a strong amide absorption (5.89 microns); the presence of the carboxylic acid function of the n-perfluorooctanoate reactant was not detected, indicating complete conversion of this reactant.

EXAMPLE 8

To a solution of 64.7 grams (0.148 mol) of methyl-n-perfluorooctanoate in 50 ml. of diethyl ether, there were added 14.2 grams (0.075 mol) of tetraethylene pentamine. The resulting solution was heated under reflux temperature for a period of 24 hours. After removal of the diethyl ether solvent under reduced pressure, there remained 60 grams of a yellow oil which did not crystallize after being allowed to stand for several days. When the product oil was subjected to distillation, it began to decompose at 180° C. and 2 millimeters pressure. The product oil, 1,13 - di - n - perfluorooctanoyl - 1,4,7,10,13-pentaazatridecane having the structural formula:

was soluble in ether, acetonitrile and acetone.

EXAMPLE 9

To an ice cooled solution of 62 grams (0.27 mol) of n-perfluorobutanoyl chloride in 40 ml. of heptane, there was added a solution of 8.7 grams (0.08 mol) of diethylene triamine in 60 ml. of water containing 15 grams of potassium carbonate. The reaction mixture was stirred for about 20 minutes, and the white solid resulting from the reaction was filtered under vacuum, washed with water and air dried. A yield of 10 grams of crude product was obtained. The crude solid product was recrystallized from chloroform to yield 1,4,7-tri-n-perfluorobutanoyl-1,4,7-triazaheptane, a white solid (melting point 109–111.5° C.), having the following structural formula:

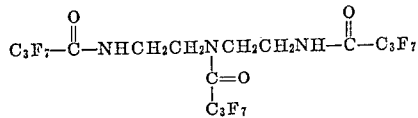

This compound was found to contain 27.73% carbon (theory 27.7%), 1.28% hydrogen (theory 1.44%), 57.14% fluorine (theory 57.7%) and 5.73% nitrogen (theory 6.08%). The infrared spectrum of the triamide product showed a strong amide absorption at 5.76 and 5.84 microns; the presence of the carboxylic acid function of the n-perfluorobutanoyl chloride reactant was not detected, indicating complete conversion of this reactant.

Additional illustrative perfluoroalkyl polyamide reaction products having oil-repellency properties are listed in following Table 1. These compositions are prepared by reaction of the perfluorocarboxylic acid and polyalkylene polyamine reactants indicated in a manner analogous to that described in the above examples.

TABLE I

| Ex. | Perfluorocarboxylic Acid Reactant | Polyalkylene Polyamine Reactant | Product |
|---|---|---|---|
| 10 | $CF_3(CF_2)_4-\overset{O}{\underset{\|}{C}}-OCH_3$ | $NH_2(C_2H_4NH)_2H$ | $CF_3(CF_2)_4-\overset{O}{\underset{\|}{C}}-NH(C_2H_4NH)_2-\overset{O}{\underset{\|}{C}}-(CF_2)_4CF_3$ |
| 11 | $F-\overset{CF_3}{\underset{CF_3}{\underset{\|}{\overset{\|}{C}}}}-CF_2(CF_2)_2-\overset{O}{\underset{\|}{C}}-Br$ | $NH_2(C_2H_4NH)_2H$ | $F-\overset{CF_3}{\underset{CF_3}{\underset{\|}{\overset{\|}{C}}}}-CF_2(CF_2)_2-\overset{O}{\underset{\|}{C}}-NH(C_2H_4NH)_2-\overset{O}{\underset{\|}{C}}-(CF_2)_2\overset{CF_3}{\underset{CF_3}{\underset{\|}{\overset{\|}{C}}}}F_2-\overset{}{\underset{}{C}}-F$ |
| 12 | $F-\overset{CF_3}{\underset{CF_3}{\underset{\|}{\overset{\|}{C}}}}-CF_2\overset{CF_3}{\underset{\|}{C}}F(CF_2)_2-\overset{O}{\underset{\|}{C}}-Cl$ | $NH_2(C_2H_4NH)_2H$ | $F-\overset{CF_3}{\underset{CF_3}{\underset{\|}{\overset{\|}{C}}}}-CF_2\overset{CF_3}{\underset{\|}{C}}F(CF_2)_2-\overset{O}{\underset{\|}{C}}-NH(C_2H_4NH)_2-\overset{O}{\underset{\|}{C}}-(CF_2)_2\overset{FC_3}{\underset{}{C}}FCF_2-\overset{CF_3}{\underset{CF_3}{\underset{\|}{\overset{\|}{C}}}}-F$ |
| 13 | $CF_3(CF_2)_{12}-\overset{O}{\underset{\|}{C}}-OC_2H_5$ | $NH_2(C_2H_4NH)_2H$ | $CF_3(CF_2)_{12}-\overset{O}{\underset{\|}{C}}-NH(C_2H_4NH)_2-\overset{O}{\underset{\|}{C}}-(CF_2)_{12}CF_3$ |
| 14 | $CF_3(CF_2)_{14}-\overset{O}{\underset{\|}{C}}-Cl$ | $NH_2(C_2H_4NH)_2H$ | $CF_3(CF_2)_{14}-\overset{O}{\underset{\|}{C}}-NH(C_2H_4NH)_2-\overset{O}{\underset{\|}{C}}-(CF_2)_{14}CF_3$ |
| 15 | $CF_3(CF_2)_7-\overset{O}{\underset{\|}{C}}-OC_4H_9$ | $NH_2(C_2H_4NH)_3H$ | $CF_3(CF_2)_7-\overset{O}{\underset{\|}{C}}-NH(C_2H_4NH)_3-\overset{O}{\underset{\|}{C}}-(CF_2)_7CF_3$ |
| 16 | $CF_3(CF_2\overset{CF_3}{\underset{\|}{C}}F)_3CF_2-\overset{O}{\underset{\|}{C}}-Cl$ | $NH_2(C_2H_4NH)_3H$ | $CF_3(CF_2\overset{CF_3}{\underset{\|}{C}}F)_3CF_2-\overset{O}{\underset{\|}{C}}-NH(C_2H_4NH)_3-\overset{O}{\underset{\|}{C}}-CF_2(\overset{CF_3}{\underset{\|}{C}}FCF_2)_3-CF_3$ |
| 17 | $CF_3(CF_2)_7-\overset{O}{\underset{\|}{C}}-Br$ | $NH_2(C_2H_4NH)_4H$ | $CF_3(CF_2)_7-\overset{O}{\underset{\|}{C}}-NH(C_2H_4NH)_4-\overset{O}{\underset{\|}{C}}-(CF_2)_7CF_3$ |
| 18 | $F-\overset{CF_3}{\underset{CF_3}{\underset{\|}{\overset{\|}{C}}}}-CF_2(CF_2)_{10}-\overset{O}{\underset{\|}{C}}-Cl$ | $NH_2(C_2H_4NH)_4H$ | $F-\overset{CF_3}{\underset{CF_3}{\underset{\|}{\overset{\|}{C}}}}-CF_2(CF_2)_{10}-\overset{O}{\underset{\|}{C}}-NH(C_2H_4NH)_4-\overset{O}{\underset{\|}{C}}-(CF_2)_{10}CF_2-\overset{CF_3}{\underset{CF_3}{\underset{\|}{\overset{\|}{C}}}}-F$ |
| 19 | $CF_3(CF_2)_6-\overset{O}{\underset{\|}{C}}-OCH_3$ | $NH_2(C_4H_8NH)_2H$ | $CF_3(CF_2)_6-\overset{O}{\underset{\|}{C}}-NH(C_4H_8NH)_2-\overset{O}{\underset{\|}{C}}-(CF_2)_6CF_3$ |
| 20 | $CF_3(CF_2)_{12}-\overset{O}{\underset{\|}{C}}-Cl$ | $NH_2(C_6H_{12}NH)_3H$ | $CF_3(CF_2)_{12}-\overset{O}{\underset{\|}{C}}-NH(C_6H_{12}NH)_3-\overset{O}{\underset{\|}{C}}-(CF_2)_{12}CF_3$ |
| 21 | $CF_3(CF_2)_{12}-\overset{O}{\underset{\|}{C}}-Cl$ | $NH_2(\overset{CH_3}{\underset{\|}{C}}HCH_2NH)_2H$ | $CF_3(CF_2)_{12}-\overset{O}{\underset{\|}{C}}-NH(\overset{CH_3}{\underset{\|}{C}}HCH_2NH)_2-\overset{O}{\underset{\|}{C}}-(CF_2)_{12}CF_3$ |
| 22 | $F-\overset{CF_3}{\underset{CF_3}{\underset{\|}{\overset{\|}{C}}}}-CF_2(CF_2)_2-\overset{O}{\underset{\|}{C}}-Br$ | $NH_2(\overset{CH_3}{\underset{\|}{C}}HCH_2NH)_3H$ | $F-\overset{CF_3}{\underset{CF_3}{\underset{\|}{\overset{\|}{C}}}}-CF_2(CF_2)_2-\overset{O}{\underset{\|}{C}}-NH(\overset{CH_3}{\underset{\|}{C}}HCH_2NH)_3-\overset{O}{\underset{\|}{C}}-(CF_2)_2CF_2-\overset{CF_3}{\underset{CF_3}{\underset{\|}{\overset{\|}{C}}}}-F$ |
| 23 | $CF_3(CF_2)_6-\overset{O}{\underset{\|}{C}}-OCH_3$ | $NH_2CH_2CH_2\underset{\underset{CH_2CH_2NH_2}{\|}}{N}CH_2CH_2NH_2$ | $CF_3(CF_2)_6-\overset{O}{\underset{\|}{C}}-NHCH_2CH_2\underset{\underset{CH_2CH_2NH_2}{\|}}{N}CH_2CH_2NH-\overset{O}{\underset{\|}{C}}-(CF_2)_6CF_3$ |
| 24 | $CF_3(CF_2)_6-\overset{O}{\underset{\|}{C}}-OCH_3$ | $NH_2CH_2CH_2\underset{\underset{CH_2CH_2NH_2}{\|}}{N}CH_2CH_2NH_2$ | $CF_3(CF_2)_6-\overset{O}{\underset{\|}{C}}-NHCH_2CH_2\underset{\underset{\underset{CH_2CH_2NH-\overset{O}{\underset{\|}{C}}-(CF_2)_6CF_3}{\|}}{\|}}{N}CH_2CH_2NH-\overset{O}{\underset{\|}{C}}-(CF_2)_6CF_3$ |

As stated above, the perfluoroalkyl polyamide compounds of the present invention are valuable as oil-repellency agents. These compounds may be applied to the article to be rendered oil repellent by treating the same with a solution of the repellent and evaporating the solvent. If desired, the treated article may then be cured at an elevated temperature. The concentration of perfluoroalkyl polyamide oil-repellent on the treated article generally may vary from about 0.5% to 10%, preferably 1.0% to 4.0%, based on the weight of the article. Since the solvent used in formulating the oil-repellent composition functions essentially as a carrier for the oil repellent agent, any organic liquid inert to the article to be treated and capable of dissolution of the requisite amount of oil-repellency agent may be employed. Acetone, methyl ethyl ketone, acetonitrile and dimethyl formamide are illustrative solvents which may be used in preparing the oil-repellent compositions. Alternatively, aqueous emulsions of the oil repellent may be applied onto the articles to be treated by conventional aqueous application methods.

The solvent may be evaporated by air drying at room temperature. If it is desired to cure the treated article, the solvent may be evaporated prior to curing or during curing of the oil repellent chemical onto the article. Preferably, the article treated with a solution of the oil repellent chemical is air dried prior to curing for a time sufficient to evaporate essentially all of the solvent. Thereafter, the article having on its surface the oil repellent chemical is cured or "heat-set" at a temperature of about 100° C. to 160° C. for a time period varying inversely with the temperature, ranging from about 1 second to 5 minutes.

The oil repellent compounds of the invention are especially useful in treating textiles (fabrics and fibers) comprised of natural and/or synthetic fibers including cotton, nylon, wool, polyethylene terephthalate and polyacrylonitrile. If desired, auxiliary agents such as those imparting water repellency, crease resistance and softening properties may be applied in conjunction with the oil repellent chemicals of the invention. In addition, other materials such as the surfaces of wood, plastics, glass, paper and metals may be treated with solutions containing the perfluoroalkyl polyamide compositions of the invention to render the same oil repellent.

Tests relating to the evaluation of typical perfluoroalkyl polyamide compositions of the present invention as oil-repellency agents were conducted. In these tests, pieces of white cotton print cloth, conditioned at 50% R.H., were dipped for about 30 seconds into 4% by weight acetone solutions of the perfluoroalkyl polyamides. The treated cloths were blotted on paper toweling, air dried overnight at 50% R.H. and weighed to determine the loading (weight percent of perfluoroalkyl polyamide composition retained on the cloth). Thereafter, the test cloth pieces were heat-set for 5 minutes in an oven at 150° C., ironed, allowed to cool to room temperature and the oil-repellency ratings thereof determined.

The procedure employed in determining the oil-repellency ratings is described, for example, on pages 323-4 of the April 1962 edition of the Textile Research Journal. This procedure involves gently placing on the treated fabric drops of mixtures of mineral oil ("Nujol") and n-heptane in varying proportions. The drops are allowed to stand on the treated fabric undisturbed for 3 minutes. After the 3 minute time period, the wetting and penetration of the fabric is visually observed. Referring to following Table II, the number corresponding to the mixture containing the highest percentage of n-heptane which does not penetrate or wet the fabric is considered to be the oil-repellency rating of the treated fabric.

TABLE II

| Oil repellency rating | Percent mineral oil [a] | Percent n-heptane [b] |
|---|---|---|
| 150 | 0 | 100 |
| 140 | 10 | 90 |
| 130 | 20 | 80 |
| 120 | 30 | 70 |
| 110 | 40 | 60 |
| 100 | 50 | 50 |
| 90 | 60 | 40 |
| 80 | 70 | 30 |
| 70 | 80 | 20 |
| 60 | 90 | 10 |
| 50 | 100 | 0 |
| 0 | (No holdout to mineral oil) | |

[a] "Nujol" Saybolt viscosity 360/390 at 100° F. Specific gravity 0.880/0.900 at 60° F. Percent by volume at 20° C.
[b] Heptane B.P. 98-99° C. Percent by volume at 20° C.

When typical oily staining materials are dropped onto treated fabrics and subsequently blotted off, those fabrics with an oil-repellency rating of 50-70 will exhibit only fair resistance to staining; those fabrics with an oil-repellency rating of 80-90 will have good resistance to staining; and those with an oil-repellency rating of 100 and up will give excellent resistance.

The results obtained are set forth in Table III below:

TABLE III

| Source of oil-repellent agent | Loading (percent by weight) | Oil-repellency Rating |
|---|---|---|
| Example 1 | 4.3 | 130 |
| Example 5 | 4.6 | 130 |
| Example 7 | 4.8 | 140 |
| Example 8 | 4.0 | 100 |
| Example 9 | 4.0 | 80 |

From the foregoing it is apparent that we have discovered a series of novel and valuable compounds possessing outstanding value as oil-repellency agents.

Since various changes and modifications may be made in the invention without departing from the spirit thereof, it is intended that all matter contained in the above description shall be interpreted as illustrative and not in a limiting sense.

We claim:
1. A polyamide compound having the structural formula:

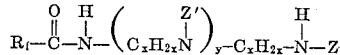

wherein $R_f$ is a perfluoroalkyl radical containing from 3 to 17 carbon atoms, $x$ is an integer of from 2 to 6, $y$ is an integer of from 1 to 4, Z is a member selected from the group consisting of hydrogen and an acyl radical having the formula

in which $R_f$ has the afore-stated meaning and $Z'$ is a member selected from the group consisting of hydrogen, an acyl radical having the formula

in which $R_f$ has the afore-stated meaning and a radical having the formula

in which $x$ and Z have the afore-stated meaning, with the proviso that at least one of Z and $Z'$ is an acyl radical or a radical having the formula

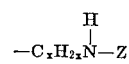

in which Z is an acyl radical, said acyl radical having the afore-stated formula.

2. A polyamide compound having the structural formula:

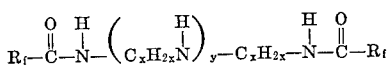

wherein $R_f$ is a perfluoroalkyl radical containing from 6 to 14 carbon atoms, $x$ is an integer of from 2 to 4 and $y$ is an integer of from 1 to 4.

3. A polyamide compound having the structural formula:

4. A polyamide compound having the structural formula:

5. A polyamide compound having the structural formula:

6. A polyamide compound having the structural formula:

7. A textile material rendered oil repellent by treatment with an effective amount of a compound having the structural formula:

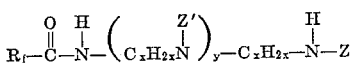

wherein $R_f$ is a perfluoroalkyl radical containing from 3 to 17 carbon atoms, $x$ is an integer of from 2 to 6, $y$ is an integer of from 1 to 4, Z is a member selected from the group consisting of hydrogen and an acyl radical having the formula

in which $R_f$ has the afore-stated meaning and Z' is a member selected from the group consisting of hydrogen, an acyl radical having the formula

in which $R_f$ has the afore-stated meaning and a radical having the formula

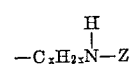

in which $x$ and Z have the afore-stated meaning, with the proviso that at least one of Z and Z' is an acyl radical or a radical having the formula

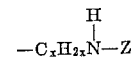

in which Z is an acyl radical, said acyl radical having the afore-stated formula.

8. A textile material rendered oil repellent by treatment with an effective amount of a compound having the structural formula:

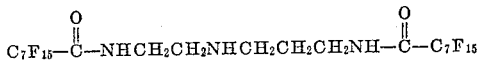

9. A textile material rendered oil repellent by treatment with an effective amount of a compound having the structural formula:

10. A textile material rendered oil repellent by treatment with an effective amount of a compound having the structural formula:

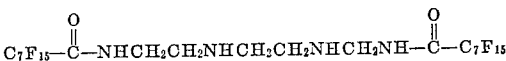

11. A textile material rendered oil repellent by treatment with an effective amount of a compound having the structural formula:

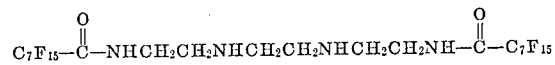

References Cited

UNITED STATES PATENTS 2,567,011 9/1951 Diesslin et al. _____ 260—487
2,764,603 9/1956 Ahlbrecht _____ 260—561

WILLIAM D. MARTIN, *Primary Examiner.*

THEODORE G. DAVIS, *Assistant Examiner.*

U.S. Cl. X.R.

117—138.8, 139.5, 141, 143, 161; 260—404.5, 561

UNITED STATES PATENT OFFICE
CERTIFICATE OF CORRECTION

Patent No. 3,420,697

January 7, 1969

Richard F. Sweeney et al.

It is certified that error appears in the above identified patent and that said Letters Patent are hereby corrected as shown below:

Column 5, line 26, "1.4." should read -- 1,4, --. Column 6, line 33, "89-82° C." should read -- 89-92° C. --; lines 37 and 38, the formula should appear as shown below:

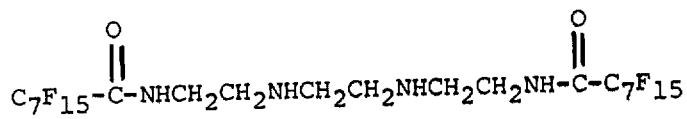

Columns 7 and 8, TABLE I, second column, the first formula should appear as shown below:

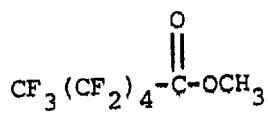

same table, fourth column, the second formula should appear as shown below:

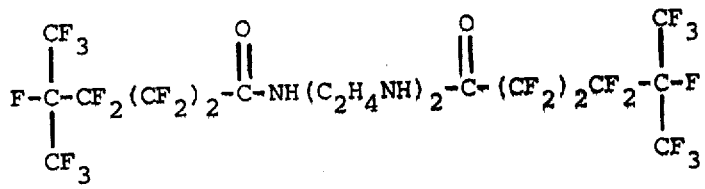

same table, fourth column, the nineth formula should appear as shown below:

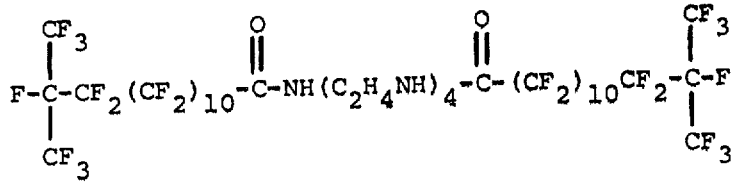

Column 11, lines 11 to 13, the formula should appear as shown below:

$$C_7F_{15}-\overset{O}{\overset{\|}{C}}-NHCH_2CH_2NHCH_2CH_2NH-\overset{O}{\overset{\|}{C}}-C_7F_{15}$$

Column 12, lines 23 to 24, the formula should appear as shown below:

$$C_7F_{15}-\overset{O}{\overset{\|}{C}}-NHCH_2CH_2CH_2NHCH_2CH_2CH_2NH-\overset{O}{\overset{\|}{C}}-C_7F_{15}$$

same column 12, lines 34 and 35, the formula should appear as shown below:

$$C_7F_{15}-\overset{O}{\overset{\|}{C}}-NHCH_2CH_2NHCH_2CH_2NHCH_2CH_2NHCH_2CH_2NH-\overset{O}{\overset{\|}{C}}-C_7F_{15}$$

Signed and sealed this 24th day of March 1970.

(SEAL)
Attest:

EDWARD M. FLETCHER, JR.
Attesting Officer

WILLIAM E. SCHUYLER, JR.
Commissioner of Patents